Patented Aug. 14, 1945

2,382,360

UNITED STATES PATENT OFFICE 2,382,360

FLOTATION PROCESS

Nathan Weiner, West Forest Hills, N. Y., assignor to Bonneville, Limited, New York, N. Y., a corporation of Delaware No Drawing. Application November 4, 1940,
Serial No. 364,251

4 Claims. (Cl. 209—166)

This invention relates to the froth flotation of ores and salt mixtures containing potassium and sodium chlorides. The invention provides a new froth flotation process by which potassium chloride may be advantageously separated from such ore or salt mixtures by the use of new flotation agents.

The new flotation agents used in the new froth flotation process by which potassium chloride is separated from ore or salt mixtures containing potassium and sodium chlorides are water-soluble salts of straight chain alkyl esters of glycine in which the alkyl group contains at least 6 carbons. Advantageously, for the froth flotation of potassium chloride the alkyl group of the esters contains from 6 to 18 carbon atoms, esters in which the alkyl group contains from 6 to 12 carbon atoms being particularly advantageous. The new flotation agents are advantageously used in the form of their hydrochloride salts although any other suitable water-soluble salt may of course be used.

The new flotation agents are advantageously prepared by reacting the alcohol corresponding to the particular ester desired with glycine. Thus, for example, in preparing the octyl ester of glycine hydrochloride, about 26 parts of glycine are suspended in 200 parts of normal octyl alcohol. Dry hydrogen chloride gas is then bubbled into the suspension at room temperature until about 26 parts of hydrogen chloride have been absorbed. The mixture is then heated and stirred at 100° C. for about one hour. Thereupon more hydrogen chloride gas is bubbled into the suspension until an additional 20 parts are absorbed. The mixture is again heated and stirred at 100° C. for about 16 hours. At the end of this time substantially all of the glycine has dissolved. The undissolved glycine is filtered off and the solution is concentrated by removing the excess octyl alcohol by heating the solution to a temperature not above 100° C. under a pressure of 2 to 3 mm. The syrup which remains crystalizes on cooling and may be freed from any remaining alcohol by suspension in ether and filtration. The solid product is the normal octyl ester of glycine hydrochloride.

Similarly, the lauryl ester of glycine hydrochloride may be prepared by treating a suspension of 25 parts of glycine in about 250 parts of lauryl alcohol with hydrogen chloride in the manner just described. The mixture is heated at 100° C. for about 88 hours with the periodic addition of hydrogen chloride. The total amount of hydrogen chloride added during this period is about 45 parts. Undissolved glycine is filtered from the solution and the filtrate on cooling deposits a solid which is collected by filtration and washed with acetone. This solid is the lauryl ester of glycine hydrochlorite.

The use of the new flotation agents in accordance with the process of the invention will be illustrated by reference to the separation of potassium chloride from a crude crystallized mixture of potassium and sodium chlorides from the Bonneville district of Utah. Such crude salt mixtures may be prepared from a brine obtained from a natural salt deposit in the Bonneville district. The potassium chloride content of the deposit is only a few percent., the bulk of the deposit consisting of sodium chloride with small amounts of soluble salts, e. g., magnesium chloride. The brine is partially evaporated to allow a large amount of the sodium chloride to crystallize out. The mother liquor is then further evaporated to produce a mixture of salts containing varying amounts of potassium chloride, sometimes as much as 40% or more. This mixture, as a pulp in saturated brine, is subjected to froth flotation in the presence of the reagents. Specific examples are given below.

Example 1

*Flotation reagent.*—Normal hexyl ester of glycine hydrochloride, 1 lb. per ton of crude potassium chloride-sodium chloride mixture.

| Product | Weight | Weight | KCl | Recovery |
|---|---|---|---|---|
| | | Percent | Percent | Percent |
| Tails | 431 | 85.35 | 5.78 | 31.1 |
| Concentrates | 74 | 14.65 | 74.6 | 68.9 |

Example 2

*Flotation reagent.*—Normal octyl ester of glycine hydrochloride, 0.4 lb. per ton of crude potassium chloride-sodium chloride mixture.

| Product | Weight | Weight | KCl | Recovery |
|---|---|---|---|---|
| | | Per cent | Per cent | Per cent |
| Tails | 403 | 78.0 | 3.61 | 15.2 |
| Concentrates | 114 | 22.0 | 71.3 | 84.8 |

Example 3

*Flotation reagent.*—Normal dodecyl ester of glycine hydrochloride, 0.4 lb. per ton of potassium chloride-sodium chloride mixture.

| Product | Weight | Weight | KCl | Recovery |
|---|---|---|---|---|
| | | Per cent | Per cent | Per cent |
| Tails | 435 | 84.3 | 4.95 | 23.9 |
| Concentrates | 81 | 15.7 | 84.60 | 76.1 |

Although the process of the invention has been illustrated by the reference to the separation of potassium chloride from a mixture of sodium and potassium chlorides obtained from the Bonneville district of Utah, it is to be understood that it may also be used with advantage in separating potassium chloride from other substances containing potassium and sodium chlorides in admixture.

The various glycine derivatives may be used in admixture in carrying out the process, or they may be used in conjunction with other suitable flotation agents. Suitable frothing agents may also be used in conjunction with the new flotation agents.

The amount of the new flotation agents used in practicing the process of the invention varies, depending among other things upon the amount of potassium chloride in the pump subjected to flotation. In general the amount of flotation agent is advantageously from about 0.4 to 1.0 lb. per ton of salts in the pump subjected to flotation.

I claim:

1. The process of separating potassium chloride from a pulp containing potassium and sodium chlorides which comprises subjecting said pulp to froth flotation in the presence of the normal hexyl ester of glycine hydrochloride.

2. The process of separating potassium chloride from a pulp containing potassium and sodium chlorides which comprises subjecting said pulp to froth flotation in the presence of the normal octyl ester of glycine hydrochloride.

3. The process of separating potassium chloride from a pulp containing potassium and sodium chlorides which comprises subjecting said pulp to froth flotation in the presence of the normal dodecyl ester of glycine hydrochloride.

4. The process of separating potassium chloride from a pulp containing potassium and sodium chlorides which comprises subjecting said pulp to froth flotation in the presence of a water-soluble salt of a straight chain alkyl ester of glycine in which the alkyl group contains from six to twelve carbon atoms.

NATHAN WEINER.